Dec. 29, 1964　　　　　　　F. D. WERNER　　　　　3,163,040
DE-ICED PITOT STATIC TUBE
Filed Jan. 4, 1962　　　　　　　　　　　　　3 Sheets-Sheet 2
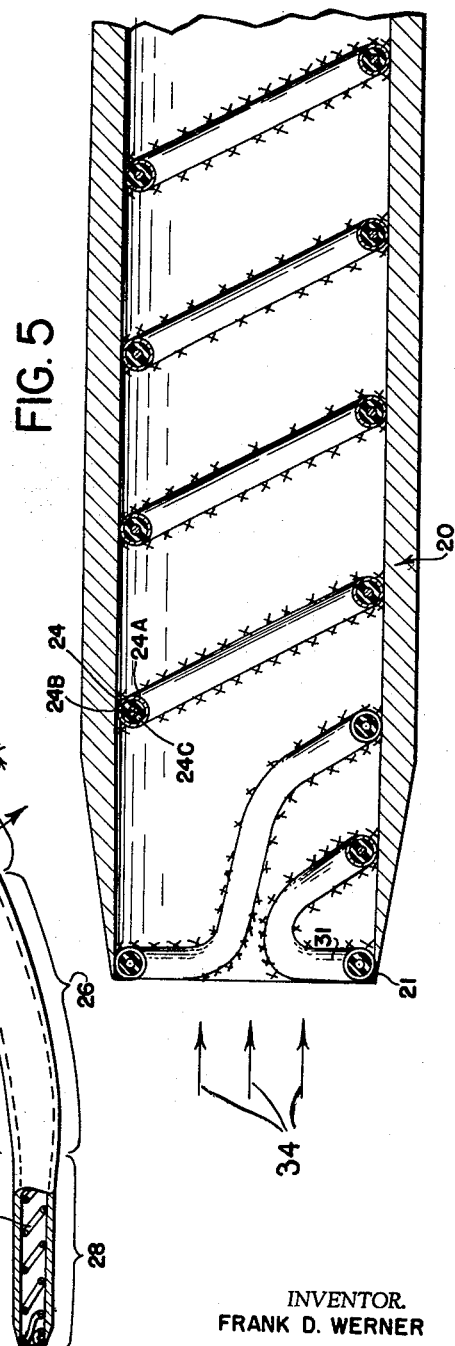
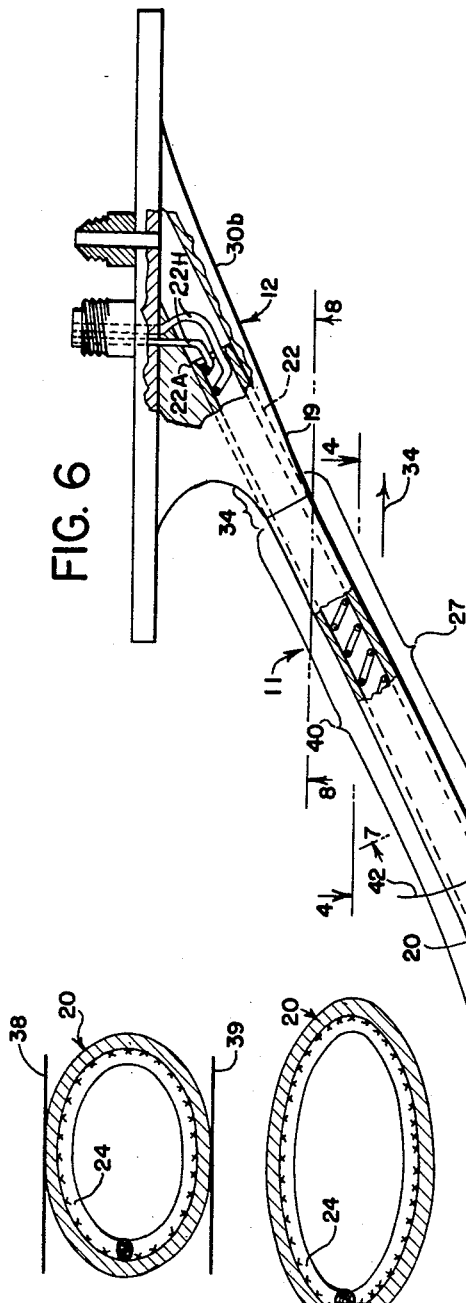
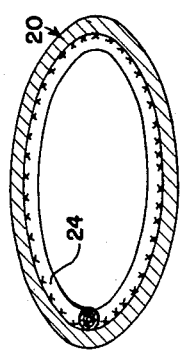
INVENTOR.
FRANK D. WERNER
BY
Dugger & Johnson
ATTORNEYS

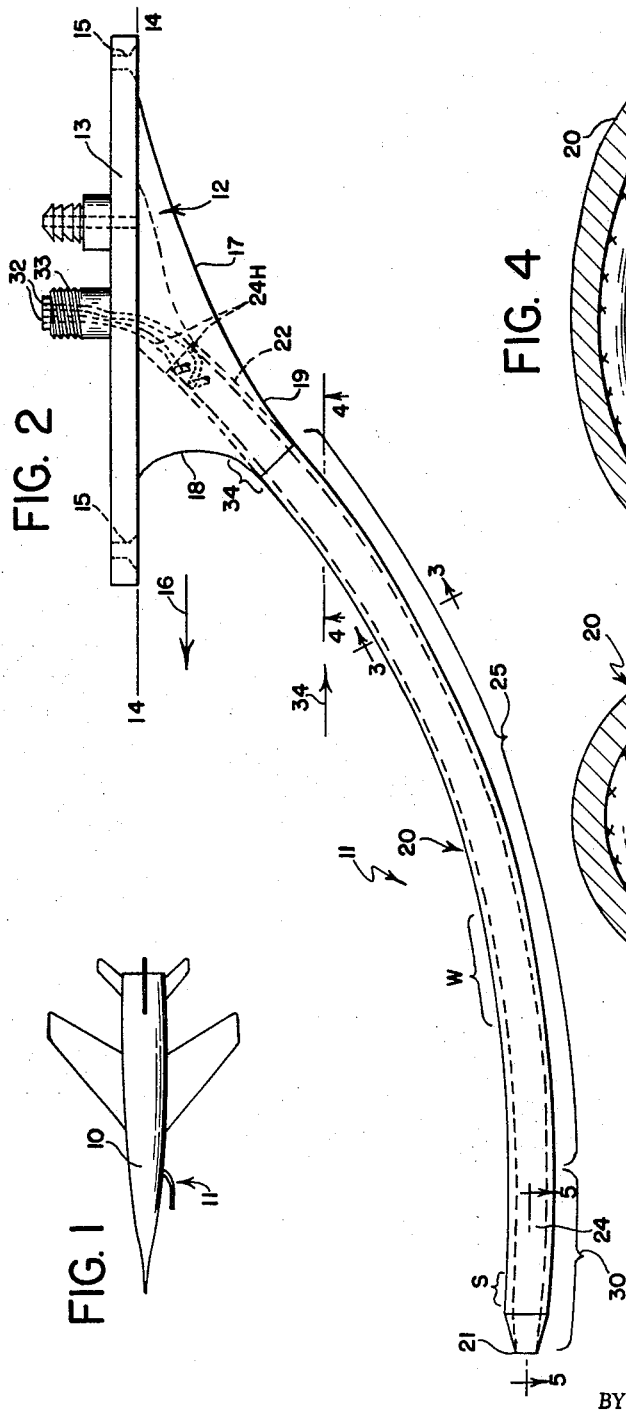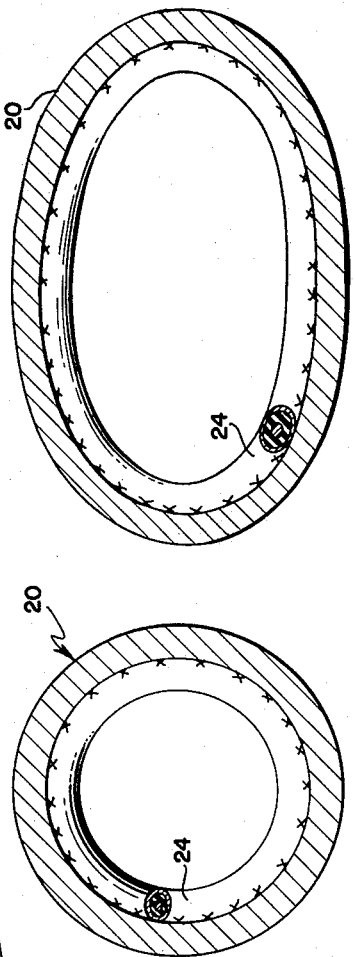

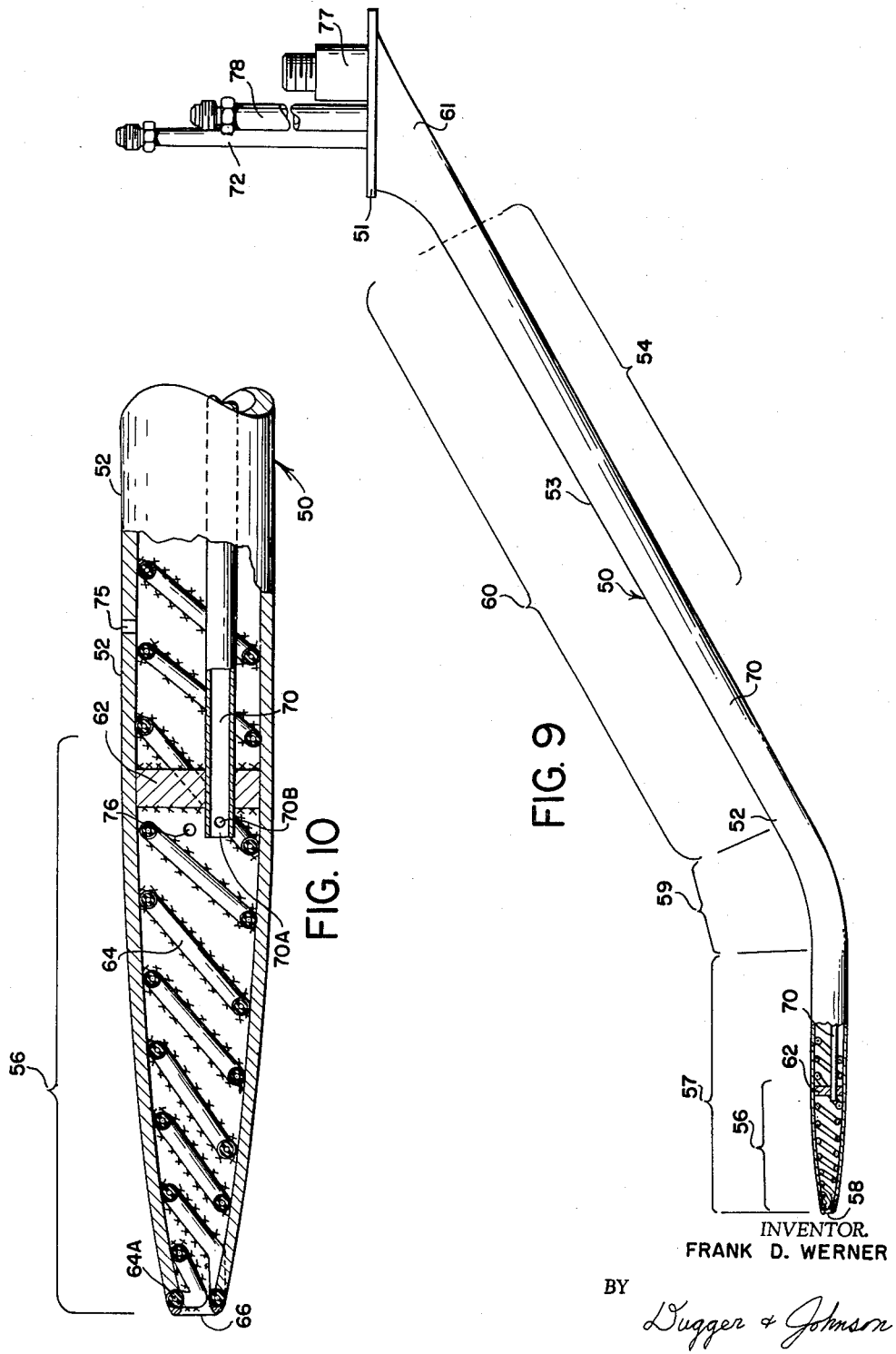

United States Patent Office 3,163,040
Patented Dec. 29, 1964

3,163,040
DE-ICED PITOT STATIC TUBE
Frank D. Werner, Minneapolis, Minn., assignor to Rosemount Engineering Company, Minneapolis, Minn., a corporation of Minnesota
Filed Jan. 4, 1962, Ser. No. 164,280
13 Claims. (Cl. 73—212)

This invention relates to de-iced Pitot and Pitot-static tubes of simplified and inexpensive construction. Heretofore, the art has provided a wide variety of Pitot and Pitot-static tubes, some being de-iced. In its simplest form, a Pitot tube is merely a tube mounted on an aircraft, and extending in a forward direction, beyond the wing, or fuselage of the aircraft. An ordinary tube thus projecting forwardly from the aircraft will operate satisfactory to give the "Pitot" pressure, except that under conditions of heavy precipitation, and during de-icing, the tube will become inaccurate, or completely inoperative. When the tube is provided with suitable heating devices, it is capable of withstanding icing conditions, and heated Pitot and Pitot static tubes have heretofore been provided. However, these have been of heavy and expensive construction.

It is an object of this invention to provide improved, lightweight, inexpensive Pitot and/or Pitot-static tubes. It is another object of the invention to provide improved lightweight inexpensive heated Pitot and/or Pitot-static tubes. It is a further object of the invention to provide improved Pitot and/or Pitot-static tubes having reduced aerodynamic drag.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which:

FIGURE 1 is a plan view of an aircraft showing a fuselage mounting for the improved Pitot and/or Pitot-static tubes of the present invention. FIGURE 2 is a side elevational view of one form of heated Pitot tube of the present invention. FIGURE 3 is a transverse section of heated Pitot tube, taken in the direction of arrows 3—3 of FIGURE 2. FIGURE 4 is also transverse section of the heated Pitot tube shown in FIGURE 2 and taken along the line and in the direction of the arrows 4—4 of FIGURE 2. The line 4—4 of FIGURE 2 is the direction of movement of the air relative to the Pitot tube shown in FIGURE 2 when the Pitot tube is mounted on the aircraft. FIGURE 5 is an enlarged fragmentary longitudinal section through the end of the Pitot tube shown in FIGURE 2. FIGURE 6 is a side elevational view, partly broken away, and partly in section showing a somewhat modified form of heated Pitot tube embodying the present invention. FIGURE 7 is a transverse sectional view taken along the line and in the direction of the arrows 7—7 of FIGURE 6. FIGURE 8 is also a transverse sectional view taken along the line and in the direction of arrows 8—8 of FIGURE 6. The line 8—8 of FIGURE 6 shows the direction of movement of the air relative to the Pitot tube when the Pitot tube is mounted on aircraft. FIGURE 9 is a side elevational view partly broken away and in section illustrating another form of heated Pitot-static tube embodying the present invention. FIGURE 10 is an enlarged fragmentary longitudinal sectional view of the heated Pitot-static tubes shown in FIGURE 9.

Throughout the drawings, corresponding numerals refer to the same parts.

Referring to the drawings, in FIGURE 1 there is illustrated an aircraft 10 having a fuselage mounted Pitot-static tube generally designated 11. It is to the Pitot-static tubes of the type that are mounted on a fuselage or on some other surface from which they extend laterally and thence forwardly moving into the air stream that the present invention is directed. It will be appreciated that in some instances the Pitot-static tubes may be mounted upon the upper or lower surface of the wing, in somewhat the same manner of the Pitot-static tube shown at 11 and FIGURE 1. In such positions, the tube mounting surface is parallel to the air flow along that surface when the aircraft is in flight and the tube extends outwardly from the surface and then in a direction generally paralleling the surface, with the open end of the Pitot-static (or Pitot) tube directed upstream in respect to the air flow.

Referring to FIGURES 2–5, there is in these figures illustrated one form of Pitot tube embodying the present invention. The Pitot tube comprises a base generally designated 12 having a mounting surface 13, which may, if desired, be inset into the aircraft surface 14—14 upon which it is mounted. Screw holes 15—15 are provided around the periphery of the base 13, by means of which it may be attached to the airframe. When the airframe is in motion, it will move in the direction of the arrow 16 and the relative wind is in the direction of arrow 34. The base plate 13 has an integrally formed coupling section or horn 19 along curves 17 and 18 which define the horn. The horn extends from the base and to some extend bends upstream in respect to the air flowing along the base. The end 22 of tube 20 which enters into the horn 19 of base 12 is suitably fastened by welding or brazing. At 34, where the tube enters the horn 19, the weld or brazing material is built up so as to form a smooth fillet, which is then polished off.

As shown in FIGURE 3, the tube 20 in this embodiment of the invention is of circular cross-section with the heater element 24 inside of it. However, relative wind blowing in the direction of arrow 34 across the tube 20 meets the tube at an oblique angle, and consequently there is provided an elongated section in the direction of air flow, as shown in FIGURE 4. This contributes to the reduction in aerodynamic drag.

It is preferred to make the tube 20 of the lightest and strongest materials available, preferably of stainless steel and the tube is originally straight and is then bent to the desired shape as shown in FIGURE 2.

The curve extends throughout the portion opposite bracket 25, gradually aligning parallel with the arrow 34, and the end portion 30 is straight.

A heater element 24 is provided in the tube 20 to discourage icing.

Referring to FIGURE 5, it will be noted that the heater element 24 has the sheath 24A, which is of metal or plastic resistant to heat and an insulated heater resistance wire 24B. When sheath 24A is metal, between the heater wire and the sheath there is provided insulation 24C. This extends throughout the heater element. At the end of the heater element which is toward the open end 21 of the Pitot tube 20 is made into a loop 24D which substantially encircles the open end of 21 of tube 20, to which it is attached on the inside. The opposite ends 24H of the heater element are carried out through the base and the resistance wire thereof is connected to suitable terminals 32 in the electrical half-connector 33, which is preferably made integral with the base 12. A suitable external electric circuit is then made to the connector 33 and electricity will then flow through the wire 24B throughout the entire length thereof.

Since the entire electrical resistance wire is covered by the sheath 24A, which is in turn encased in the tube 20, little electrostatic or magnetic disturbance will result. The closeness of spacing of the turns of the de-icing heating element may be varied so as to provide heat where needed. Usually more heat is needed at the tube mouth 21 and at the base because its larger area and the turns of heater 24 are more concentrated at these places. The heater 24 is helically coiled so that with the turns may be spaced as needed, the coil will spring out a little, against the inside of the tube. The coiled heater is pulled in and positioned in tube 20 after the tube is bent, and it is then fastened in place.

The type of fastening between the heater and tube depends upon whether the heater is metal sheathed or plastic sheathed. There are available certain plastics which withstand heat and plastic cements by which metal or plastics can be fastened to metal. Thus, a high temperature resistant plastic insulated heater wire can be coiled and put in tube 20 and cemented into place with plastic adhesive. A heater wire covered with woven glass insulation can be cemented in place by a fused ceramic, applied through the tube as a slurry to wet the insulated heater wire and inside of tube and then fused. Where a metal sheathed insulated heater wire is used, the fastening of the sheath to the tube can be by either of the foregoing methods which are by brazing, for example; copper brazing is excellent.

Referring to FIGURE 6, there is illustrated another form of Pitot tube embodying the invention. In this embodiment the principles of construction are generally the same except the tube 20 is bent so as to concentrate the bend at 26, and the portions 27 and 28 of the tube are straight, and the tube 20 is flattened slightly to enhance streamlining. Otherwise, tube 20 is fabricated in the same manner as previously described with these differences. Thus, after the tube 20 is bent at 26 and fastened to base 12, the heater coil is put in, as previously described. After the helical coil 24 of the heating element has been placed in the tube 20, but before fastening the coil to the tube (as by brazing, cementing or fusing), and after the tube 20 has been bent at 26 to the desired plan configuration, the tube 20 is then slightly flattened by pressure being applied in a direction which is normal to the plane of the drawing, FIGURE 6. The tube is preferably flattened slightly from its round cross section by pressure applied by plates as at 38 and 39, as shown in FIGURE 7. This causes the tube 20 to be deformed into an oval shape, and the heater element 24 is likewise deformed to such configuration, but it still will retain contact with the inside of the tube.

The flattening is done only throughout that portion opposite bracket 40, see FIGURE 6, and the plates 38 and 39 (FIGURE 7) are so shaped at the ends so that the flattened part of the tube will blend into the circular part. After this is done, the heater element is attached (brazed, cemented or fused) into the inside of the tube 20, as previously described.

The flattened portion of the tube is preferably that portion opposite the bracket 40, reaching through most of the curve 26 and through the straight portion 27 of the tube adjacent the fillet at 34. The portion 22 of the tube which enters the neck 19 of base 12 may be circular or flattened as desired. It is a little more convenient to make this portion 22 circular, since then the hole in horn 19 may be drilled.

The flattening of the tube produces a cross-section, as shown, for example, in FIGURE 7. The degree of flattening is limited only by the amount that can be withstood by the metal of the tube and the coil of heater element 24 within the tube, but it is usually only desirable to slightly flattened the tube as shown in FIGURE 7. When the tube is thus flattened, it has increased strength against bending in the direction of arrow 42, and has the additional advantage that in the direction of the movement of the relative wind, as shown by arrow 34, the cross-sectional shape of the tube is substantially elongated, as illustrated by FIGURE 8, and this substantially reduces aerodynamic drag.

The invention is thus illustrated as being utilized in connection with Pitot tubes of the forms shown in FIGURES 2 and 6. The invention may be also utilized in Pitot-static tubes, as shown in the exemplary form illustrated in FIGURES 9 and 10. In this form, the tube generally designated 50 is provided with a base 51, which is attached as previously described. The tube 50 of portions 57, 58 and 60 is originally straight and throughout part of its length opposite bracket 54 may have an enlarged diameter 53. The tube 52 can, if desired, simply be swaged to a somewhat larger size 53 throughout a portion of its length extending opposite the bracket 54, or a tube of prescribed sidewall thickness may have its outer end portion 52 (beyond portion 54) machined down so as to provide a somewhat smaller outer diameter at the portion 52. In some instances, nesting tubes may be used by slipping together with a length of tube of size 53 slipped onto a tube of size 52 which extends throughout the entire length of the Pitot tube, and the tubes thereafter welded or brazed together. Thus, diverse methods of manufacture may be utilized.

The outer end of the Pitot tube shown under the bracket 56 is swaged down to a somewhat smaller diameter, thereby producing a somewhat pointed effect, which, however, leaves open the forward end 58. Throughout that portion of the tube which is under the bracket 57, the tube is straight. That portion of the tube under the bracket 59 is made curved, whereas that portion of the tube under the bracket 60 is made straight. If desired, the curved section may be extended all the way back to the mounting 61 if desired, as shown in FIGURE 4. The portions of the tube under brackets 59 and 60 may be flattened if desired, as in FIGURES 6–9.

Referring especially to FIGURE 10, the forward end portion 56 of the tube is provided with a bulkhead 62. The bulkhead constitutes a small metallic washer of the same inside diameter as tube 52. This washer is provided with a suitable notch so as to permit the heater element 64 to pass through it, while still contacting the inner surface of the tube 52. The heater element 64 is of the same type as previously described and is initially formed into a helical coil, which is then drawn into the originally straight Pitot tube 50. The diameter of the helix of the heater element 64 is preferably reduced throughout that part of the tube which enters into the swaged-down portion 56 at the forward end of the Pitot tube, and the helical coil is then formed into a ring 64A, which is at the forward end of the material of which the tube is composed and the end (not shown) is then brought back into the tube and the electrical connection made as in FIGURE 5. This ring 64A serves to provide de-icing heat at the entrance mouth. The connection at the entrance mount between the electrical heating wire and the inside of the tube 52 adjacent the mouth may be made by bending a portion of the wire into the tube so as to expose the wire and permit electrical connection to be made to the inside of the tube. The front of the tube mouth can be built up with braze material 66 on top the heater to give a knife edge.

The heater element is then worked into helical form through the gradually increasing diameter of the tube as shown under the bracket 56 as it passes through the washer 62 by means of a spiral notch (not shown) in the edge of the washer.

Through the washer 62 there also extends a tube 70, which has an open forward mouth 70A and several drain holes 70B in the side of the tube which is ahead of the bulkhead washer 62. The tube 70 extends all the way back through the Pitot tube and finally makes connection to the external connections 72, of the base 61. An aperture is provided at 75 in the wall of the tube 50, which is downstream from the bulkhead washer 62 and a very small drain 76 is provided in the wall of the Pitot tube, in a position which is normally downward and slightly ahead of the bulkhead washer 62. After the parts have been suitably arranged, they are suitably cemented or brazed in place. The base 61 is provided with an electrical outlet connection 77 to which the electrical heating element 64 is attached and with a connection at 78 which extends into the Pitot tube 50.

Accordingly, this configuration of Pitot-static tube provides a heated entrance 66 into which air may move. Any ice which tends to form at the edge 66 is immediately melted by heater ring 64A, and water may flow back into that portion of the tube shown under the bracket 56 which is ahead of the bulkhead washer 62. This water will drain from the aperture 76 which is, however, so small as not to materially effect the Pitot-pressure within the open end of the tube 50. This pressure is communicated to the port 70A of the tube 70, and any moisture which is in the tube 70 adjacent its open mouth is permitted to drain via holes 70B. The static pressure is read via port 75. This static pressure is communicated along the entire lengths of the Pitot tubes to the pressure connection 78, whereas the Pitot-pressure is communicated via tube 70 to the connection 72. Electrical connection is via connector 77.

The invention thus provides for the economical manufacture of a heated Pitot tube using mostly standard materials such as stainless steel tubing which may be bought at low cost and formed into the configuration desired and standard heater elements. The invention is applicable not only to Pitot tubes, but to Pitot-static tubes, and several configurations, capable of reducing aerodynamic drag are provided. It could also be applied to static pressure tubes, of course, by omitting the Pitot opening. Static pressure tubes are rarely needed by most airplanes.

As many apparently widely different embodiments of this invention may be made without departing from the spirit and scope thereof, it is to be understood that I do not limit myself to the specific embodiments disclosed herein.

What I claim is:

1. A Pitot tube apparatus comprising a base plate adapted to be mounted on a portion of the aircraft along which the relative wind moves, a tube fastened to the plate so as to extend therefrom at an angle less than ninety degrees and towards the direction of the relative wind, the end portion of said tube being bent so as to be approximately parallel to the relative wind and containing suitable pressure openings, said tube being of uniform cross-section from the base to the end portion, and an elongated insulated electric resistance heater wire having a protective sheath throughout its length, said heater including the sheath being formed as a helical coil with the turns separated, said helical coil being positioned within the tube and extending from the open end towards the base, a fluid pressure connector on the base and extending to said tube and an electrical connector on the base and connected to the electrical heater wire.

2. The Pitot tube apparatus of claim 1 further characterized in that the tube is smoothly curved throughout most of its length from the base to adjacent the open end thereof.

3. The Pitot tube apparatus of claim 1 further characterized in that the tube extends straight from the base and at said angle thereto to a position laterally removed from the plane of the base and the tube is then bent in an arc so as to extend parallel to the relative wind.

4. The Pitot tube apparatus of claim 1 further characterized in that the tube is slightly flattened throughout a part of its length between the base and the open end, said tube being flattened in a plane substantially paralleling the direction of the relative wind.

5. The Pitot tube apparatus of claim 1 further characterized in that the protective sheath of the electric resistance heater is made of metal and said sheath is metallically fastened to the tube.

6. The Pitot tube apparatus of claim 1 further characterized in that the turns of the helical coil are not evenly spaced.

7. The Pitot tube apparatus of claim 1 further characterized in that said metal sheath is brazed to the inner wall of the tube.

8. The Pitot tube apparatus of claim 1 further characterized in that the base plate is provided with a reinforcing fillet at the place of connection of the tube to the base, said fillet being smoothly curved so as to blend the surface of the tube to the surface of the base and shaped so as to be streamlined in a direction parallel to the base.

9. The Pitot tube apparatus of claim 1 further characterized in that the portion thereof adjacent the forward end is gradually tapered to a smaller diameter.

10. The Pitot tube apparatus of claim 1 further characterized in that portion thereof adjacent the forward adjacent the fore end thereof in which the fore end is open directly toward the oncoming stream, and a smaller pressure tube connection extended from a separate pressure connector on said base and thence through the tube and through the bulkhead toward said fore end, and a hole through the tube downstream from the bulkhead.

11. A Pitot tube apparatus comprising a base plate adapted to be mounted on a portion of the aircraft along which the relative wind moves, said base plate having a protruding streamlined horn of gradually diminishing gerth, the axis of the horn extending at an acute angle to the base plate, an axial bore in said horn, initially straight, stainless steel tube of uniform cross-section fastened into the axial bore of the base and extending outwardly therefrom, said tube being bent forwardly so as to terminate as a short straight end portion having an open end facing the relative wind, a pressure connector on the base plate connected through the base plate and horn to said tube, an electrical heater element in the form of an insulated electrical heater wire encased in a metallic sheath, at least a portion of said heater element being in the form of a helical coil with the turns spaced, said coil fitting the inside of said tube, said sheath being metallically connected to the inner wall of said tube in heat conductive relationship.

12. The Pitot tube specified in claim 11 further characterized in that the tube is gradually curved from said base to the end portion.

13. The Pitot tube specified in claim 11 further characterized in that the tube extends straight in the direction of said axial bore and is then bent to the direction of said end portion.

References Cited in the file of this patent

FOREIGN PATENTS

| | | |
|---|---|---|
| 464,961 | Canada | May 9, 1950 |
| 750,417 | Great Britain | June 13, 1956 |